(12) United States Patent
Cimatti

(10) Patent No.: US 8,700,264 B2
(45) Date of Patent: Apr. 15, 2014

(54) CONTROL METHOD AND UNIT FOR A STEERING SYSTEM

(71) Applicant: Ferrari S.p.A., Modena (IT)

(72) Inventor: Franco Cimatti, Pavullo (IT)

(73) Assignee: Ferrari S.p.A. (IT)

( * ) Notice: Subject to any disclaimer, the term of this patent is extended or adjusted under 35 U.S.C. 154(b) by 0 days.

(21) Appl. No.: 13/750,631

(22) Filed: Jan. 25, 2013

(65) Prior Publication Data

US 2013/0197763 A1    Aug. 1, 2013

(30) Foreign Application Priority Data

Jan. 27, 2012   (IT) .......................... BO2012A000038

(51) Int. Cl.
*A01B 69/00* (2006.01)
(52) U.S. Cl.
USPC ............................................................ 701/42
(58) Field of Classification Search
USPC ............................................................ 701/42
See application file for complete search history.

(56) References Cited

U.S. PATENT DOCUMENTS

| | | | |
|---|---|---|---|
| 6,173,223 B1 * | 1/2001 | Liubakka et al. ................ | 701/42 |
| 7,571,040 B2 * | 8/2009 | Murty et al. ..................... | 701/41 |
| 2003/0042067 A1 | 3/2003 | Yanaka | |
| 2004/0117087 A1 * | 6/2004 | Dilger ............................. | 701/41 |
| 2005/0085971 A1 * | 4/2005 | Yuda et al. ...................... | 701/41 |
| 2006/0259221 A1 * | 11/2006 | Murty et al. .................... | 701/41 |
| 2010/0250069 A1 * | 9/2010 | Murty et al. .................... | 701/42 |
| 2012/0130594 A1 * | 5/2012 | Murty et al. .................... | 701/42 |

FOREIGN PATENT DOCUMENTS

| | | |
|---|---|---|
| DE | 10012222 A1 | 10/2001 |
| DE | 102005030178 A1 | 10/2006 |
| DE | 102008045243 A1 | 11/2009 |
| EP | 1568577 A2 | 8/2005 |
| JP | 9-254804 A | 9/1997 |

OTHER PUBLICATIONS

"Italian Application Serial No. IT BO20120038, Search Report dated Sep. 24, 2012", 2 pgs.

* cited by examiner

*Primary Examiner* — Hussein A. Elchanti
(74) *Attorney, Agent, or Firm* — Schwegman Lundberg & Woessner, P.A.

(57) ABSTRACT

A method and unit to control a steering system for a road vehicle, which steering system adjusts the steering angle of the front wheels of the road vehicle by means of a steering wheel; in a preliminary design and optimization step, an actual transmission error is determined, caused by the mechanical structure of a transmission device of the steering wheel which mechanically connects a steering wheel to a steering rod mechanically connected to the hubs of the front wheels; the current angular position of the steering wheel is measured; and the intensity of the servoassistance force applied by a servomechanism to the steering rod is changed as a function of the current angular position of the steering wheel and as a function of the actual transmission error.

6 Claims, 7 Drawing Sheets

CONTROL METHOD AND UNIT FOR A STEERING SYSTEM

PRIORITY CLAIM AND RELATED APPLICATIONS

This application claims the benefit of priority under 35 U.S.C. Section 119 to Italian Patent Application Serial No. BO2012A 000038, filed on Jan. 27, 2012, which application is incorporated herein by reference in its entirety.

FIELD OF THE INVENTION

The present invention relates to a method and unit to control a steering system for a road vehicle.

PRIOR ART

A steering system is provided in a road vehicle, which serves the function of controlling the steering angle, i.e. the angle existing between the direction of the front wheels (i.e. the rotational plane of the front wheels) and the longitudinal axis of the road vehicle. The steering system comprises a control shaft which is transversally arranged; at the opposite ends thereof, it is mechanically connected to the hubs of the front wheels, and is axially slidingly mounted to change the steering angle. Moreover, the steering system comprises a steering wheel which is rotatably mounted within a passenger compartment and is mechanically connected to the control shaft by means of a transmission device so that the rotation of the steering wheel determines an axial translation of the control shaft and thus a corresponding variation of the steering angle. The transmission device comprises a steering box which receives an input rotational movement from the steering wheel and returns a corresponding output axial translation movement to the control shaft; by way of example, the steering box has an internal rack-pinion mechanism, a recirculating ball screw plus linkage mechanism, screw and nut screw plus linkage mechanism, worm screw plus linkage mechanism, or other mechanism. The steering box is connected to the steering wheel by means of a transmission line made of a series of transmission shafts (normally three) connected to one another by universal joints (normally two).

The transmission line made of three transmission shafts connected to one another by universal joints (shown in FIG. 2, for example) allows the steering wheel to be mechanically connected to the steering box, respecting the mechanical constraints of the road vehicle (i.e. the need of respecting the passenger compartment spaces and biasing the several elements between the steering wheel and the steering box). Except in rare exceptions, the non-straightness of the transmission line causes a transmission error between the steering angle imparted by the driver to the steering wheel and the actual steering angle received from the steering box; the transmission error is due to angle $\alpha 1$ (shown in FIG. 2) between the rotation axis of an initial transmission shaft and the rotation axis of an intermediate transmission shaft, to angle $\alpha 2$ (shown in FIG. 2) between the rotation axis of the intermediate transmission shaft and the rotation axis of a final transmission shaft, and to angle $\alpha 3$ (shown in FIG. 3) between the planes passing through the axes of the forks of the universal joints on the intermediate transmission shaft. In addition to the kinematic effect on the transmission ratio, this transmission error causes a variation in the effort at the steering wheel (i.e. on the force that should be applied to the steering wheel to turn the steering wheel itself) which leads to a drop in the driving sensitivity as the error increases.

The transmission error is normally expressed as a variation percentage of the rotational angle of the shaft entering the steering box with respect to the rotational angle impressed to the steering wheel; as shown in FIG. 4, for example, the transmission error takes a sinusoid-like shape with periodicity given by the 360° of rotation of the steering wheel. The characteristic quantities of the transmission error are the maximum transmission error $\epsilon_{MAX}$ and the phase shifting $\delta$ which indicates the angular distance between the minimum/maximum point of the transmission error and the straight steering wheel position; the phase shifting $\delta$ is particularly annoying as it causes differences in the effort at the steering wheel according to whether the driver steers leftwards or rightwards.

Restraining the transmission error of the transmission line of the steering system is one of the essential parameters in the setup of a road vehicle, especially if the driving perception is among the features that the designer wants to mind as a priority. However, restraining the transmission error of the transmission line of the steering system very often implies geometrical constraints on the setup of the road vehicle which determine an increase in the design and assembly complexity (and thereby cost), and can also determine a non-optimization of other systems of the road vehicle.

Patent application US2003042067A1 describes a steering system of a road vehicle, in which an electrical servomechanism applies a variable servoassistance force which is determined as a function of the angular position of the steering wheel and as a function of the torque applied to the steering wheel. However, in the steering system described in patent application US2003042067A1, the driving perception perceived by the driver is not always optimal.

DESCRIPTION OF THE INVENTION

The object of the present invention is to provide a method and unit to control a steering system for a road vehicle which are free from the above-mentioned drawbacks, and especially allow the negative effects of the transmission error to be reduced without imposing strict geometrical constraints on the road vehicle setup.

A method and unit to control a steering system for a road vehicle is provided according to the present invention, as claimed in the appended claims.

BRIEF DESCRIPTION OF THE DRAWINGS

The present invention will now be described with reference to the accompanying drawings, which illustrate a non-limiting example thereof, in which.

PREFERRED EMBODIMENTS OF THE INVENTION

Figure 1:
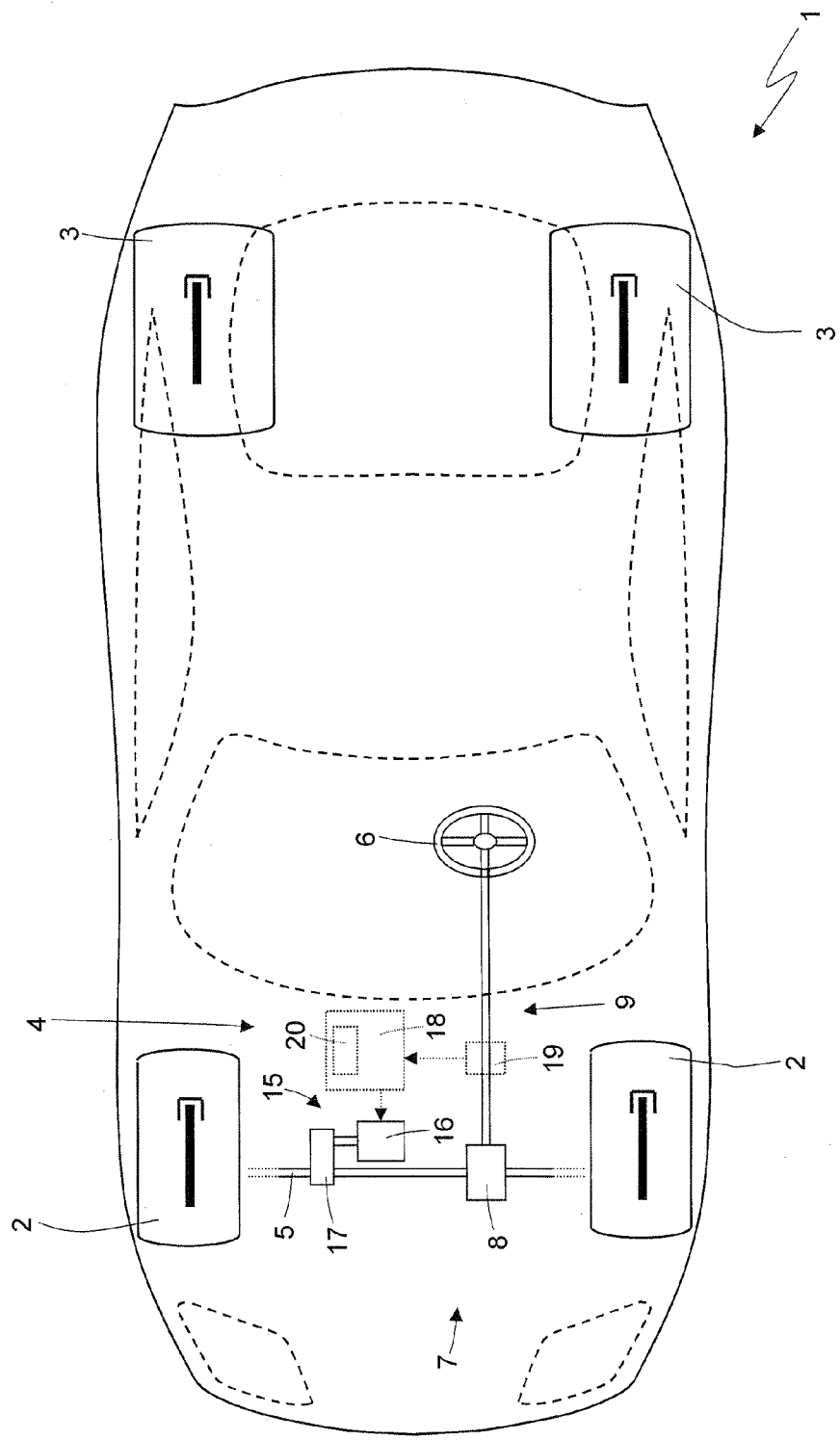
FIG. 1 shows a schematic plan view of a road vehicle provided with a steering system which operates according to the control method of the present invention.

In FIG. 1, reference numeral 1 indicates as a whole a road vehicle provided with two front wheels 2 and two driving rear wheels 3, which receive the driving torque from a motor propulsion system.

The road vehicle 1 comprises a steering system 4 which serves the function of controlling the steering angle, i.e. the angle existing between the direction of the front wheels 2 (i.e. the rotational plane of the front wheels) and the longitudinal axis of the road vehicle 1.

The steering system 4 comprises a steering rod 5 which is transversally arranged, at the opposite ends thereof it is mechanically connected to the hubs of the front wheels 2, and is axially slidingly mounted to change the steering angle. Moreover, the steering system 4 comprises a steering wheel 6 which is rotatably mounted within a passenger compartment and is mechanically connected to the steering rod 5 by means of a transmission device 7 so that the rotation of the steering wheel 6 determines an axial translation of the steering rod 5 and thus a corresponding variation of the steering angle. The transmission device 7 comprises a steering box 8 which receives an input rotational movement from the steering wheel 6 and returns a corresponding output axial translation movement to the steering rod 5; by way of example, the steering box 8 has an internal rack-pinion mechanism, a recirculating ball screw plus linkage mechanism, a screw and nut screw plus linkage mechanism, a worm screw plus linkage mechanism, or other mechanism.

Figure 2:
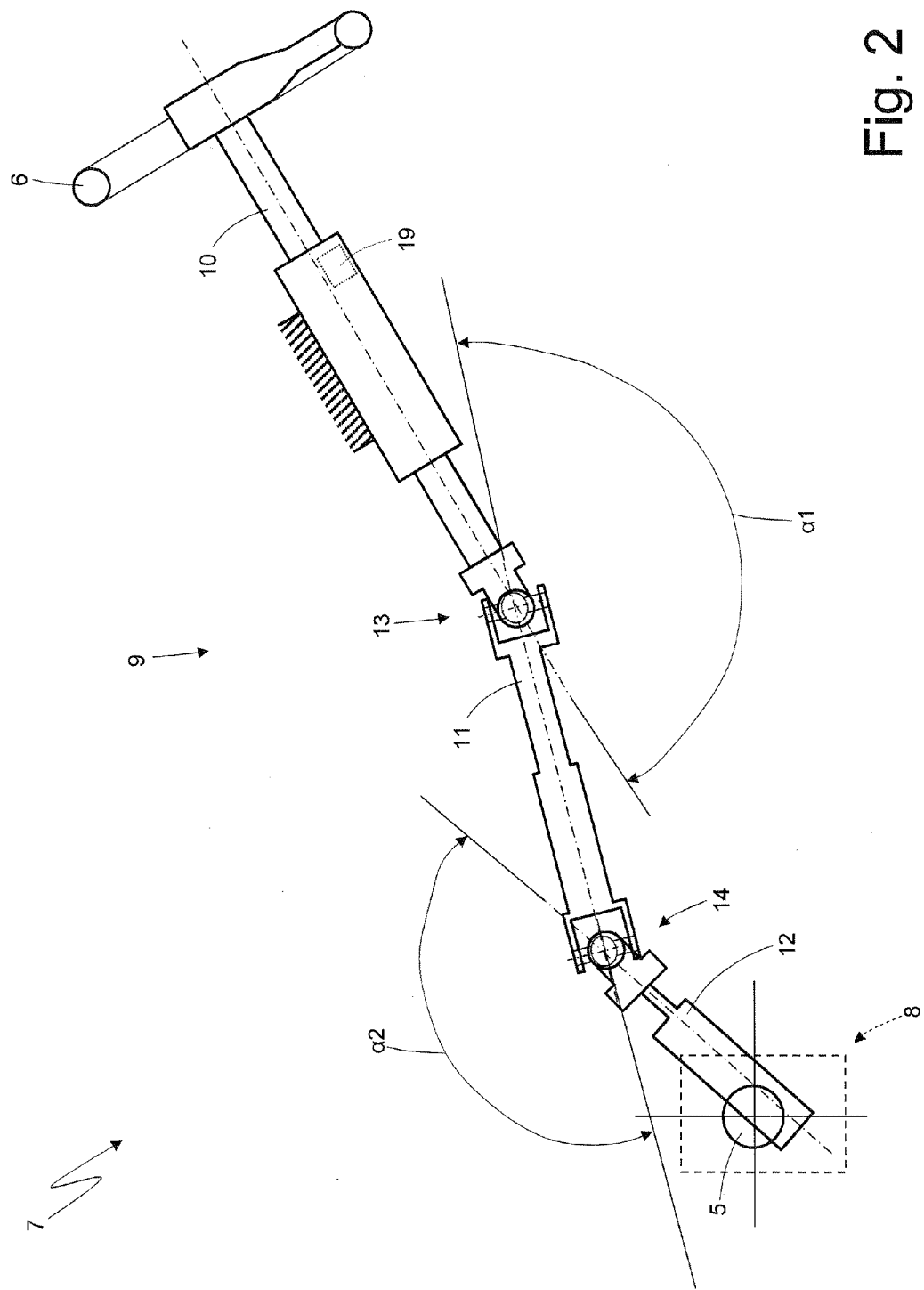
FIG. 2 shows a schematic side view, with parts removed for clarity, of a transmission line of the steering system in FIG. 1.

As shown in FIG. 2, the steering box 8 is connected to the steering wheel 6 by means of a transmission line 9 made of three transmission shafts 10, 11 and 12 connected to one another by two universal joints 13 and 14. In particular, the transmission line 9 comprises an initial transmission shaft 10 which supports the steering wheel 6 and forms the steering column of the steering wheel 6 itself, and an intermediate transmission shaft 11 which is connected at a top end to the initial transmission shaft 10 by means of the universal joint 13 and is connected at a bottom end to a final transmission shaft 12 (which forms the inlet of the steering box 8) by means of the universal joint 14.

As shown in FIG. 1, the steering system 4 comprises a servomechanism 15 that applies a variable servoassistance force to the steering rod 5 which reduces the force needed to turn the steering wheel 6. Servomechanism 15 comprises an electrical actuator 16 and a transmission 17 which mechanically connects the electrical actuator 16 to the steering rod 5.

Finally, the steering system 4 comprises an electronic control unit 18 ("ECU") which is adapted to control the electrical actuator 16 of servomechanism 15, i.e. is adapted to change the force applied by servomechanism 15 to the steering rod 5 as described hereinafter. The control unit 18 is connected to a sensor 19 which in real time detects the angular position of the steering wheel 6 and the torque applied by the driver to the steering wheel 6; it is worth noting that sensor 19 may be mechanically coupled to any one of the transmission shafts 10, 11 and 12 of the transmission line 9 (by way of example, in FIG. 2 sensor 19 is coupled to the initial shaft 10).

Figure 3:
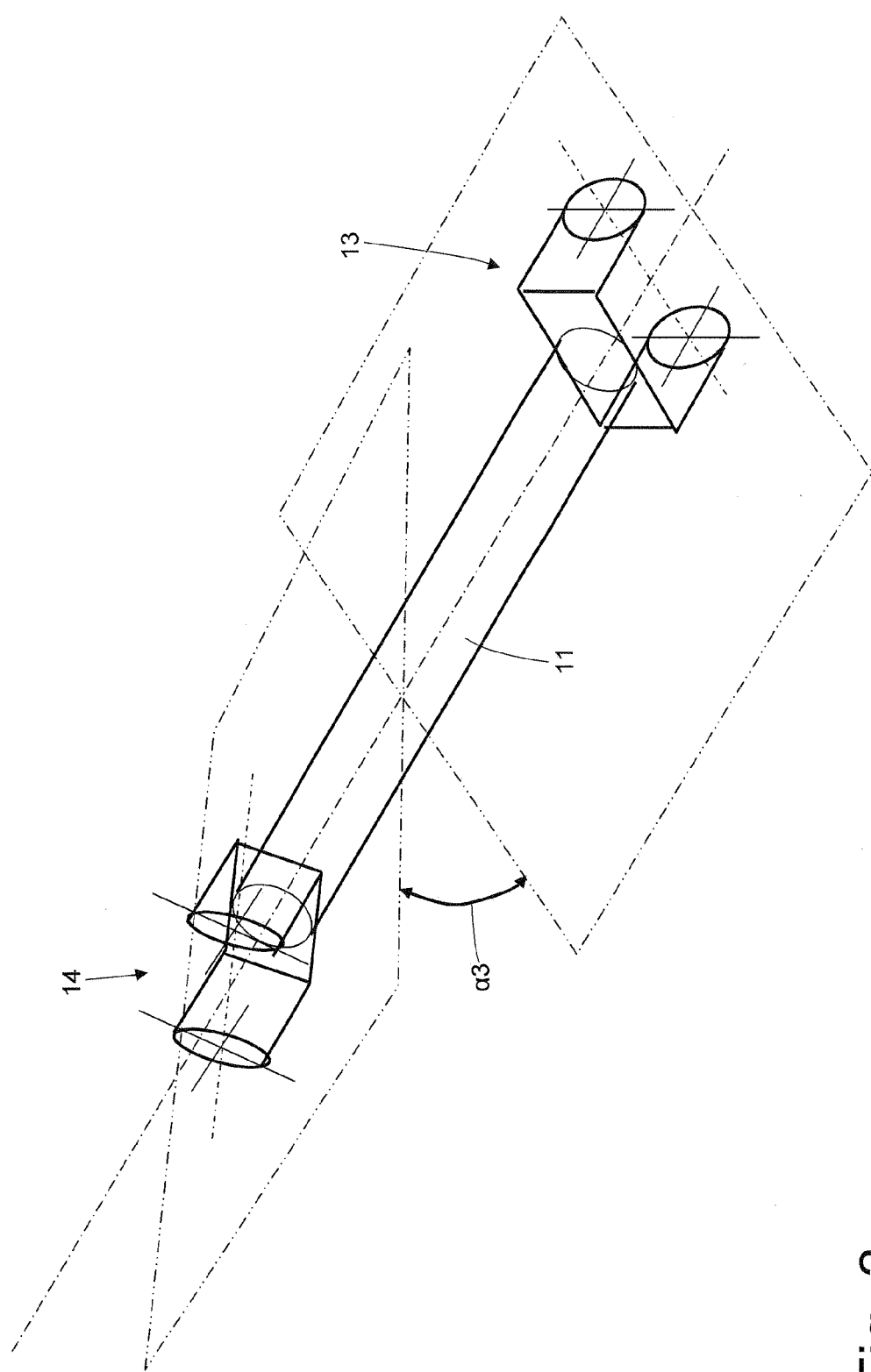
FIG. 3 shows a schematic perspective view, with parts removed for clarity, of an intermediate transmission shaft of the transmission line in FIG. 2.

The characteristic angles of the transmission line 9 are angle α1 (shown in FIG. 2) between the rotation axis of the initial transmission shaft 10 and the rotation axis of the intermediate rotation shaft 11, angle α2 (shown in FIG. 2) between the rotation axis of the intermediate transmission shaft 11 and the rotation axis of the final rotation shaft 12, and angle α3 (shown in FIG. 3) between the planes passing through the axes of the forks of the universal joints 13 and 14 on the intermediate transmission shaft 11. The characteristic angles α1, α2 and α3 of the transmission line 9 determine a transmission error between the steering angle imparted by the driver to the steering wheel 6 and the actual steering angle received from the steering box 8.

Figure 4:
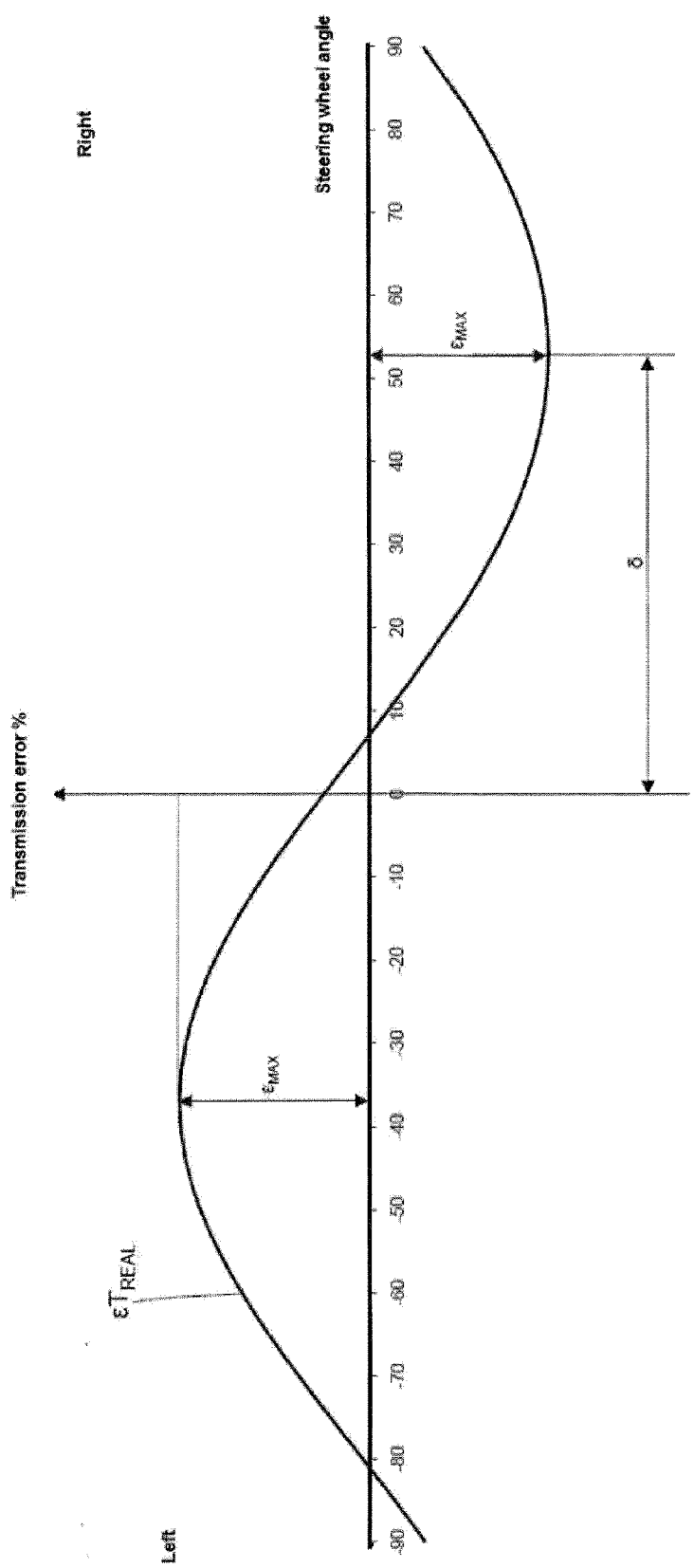
FIG. 4 shows a diagram that illustrates an actual transmission error determined by the structure of the transmission line in FIG. 2.

As shown in FIG. 4, the transmission error is expressed as a variation percentage of the rotational angle of the final transmission shaft 12 entering the steering box 8 with respect to the rotational angle impressed to the steering wheel 6; the transmission error typically takes a sinusoid-like shape with periodicity given by the 360° of rotation of the steering wheel 6. The characteristic quantities of the transmission error are the maximum transmission error $\epsilon_{MAX}$ and the phase shifting δ which indicates the angular distance between the minimum/maximum point of the transmission error and the straight steering wheel 6 position.

In a preliminary step of designing and optimizing the steering system 4, an actual transmission error $\epsilon T_{REAL}$ is determined, caused by the mechanical structure of the transmission device 7 for each angular position of the steering wheel 6; the actual transmission error $\epsilon T_{REAL}$ may be determined by means of geometrical calculations and/or by means of experimental measurements. An example of the actual transmission error $\epsilon T_{REAL}$ is shown in FIG. 4.

Figure 5:
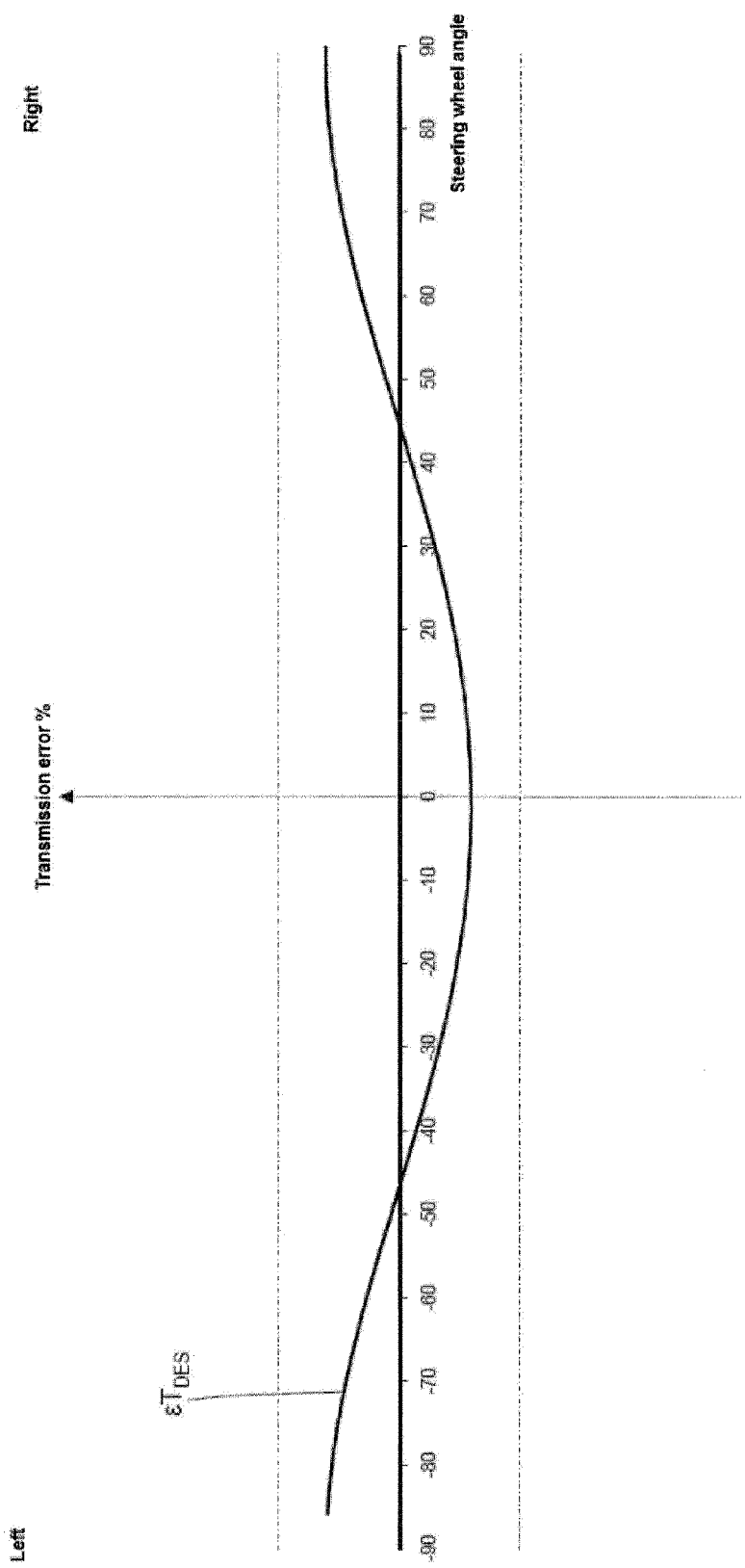
FIG. 5 shows a diagram that illustrates a target transmission error of the structure of the transmission line in FIG. 2.

Moreover, in the preliminary step of designing and optimizing the steering system 4, a target (optimal) transmission error $\epsilon T_{DES}$ is determined for each angular position of the steering wheel 6; an example of the target transmission error $\epsilon T_{DES}$ is shown in FIG. 5. It is worth noting that normally the target transmission error $\epsilon T_{DES}$ is not null since it is preferable to have a (slightly) increasing transmission error as the steering angle increases in order to have a progressive increase of the effort needed to turn the steering wheel 6 as the steering angle increases; thereby, a better driving perception can be given to the driver. Obviously, it is also possible for the target transmission error $\epsilon T_{DES}$ to always be null at all steering angles. In any case, it is essential for the target transmission error $\epsilon T_{DES}$ to be "symmetric" (i.e. to have a null phase shifting δ) in order to prevent differences when turning the steering wheel 6 in the two directions.

Figure 6:
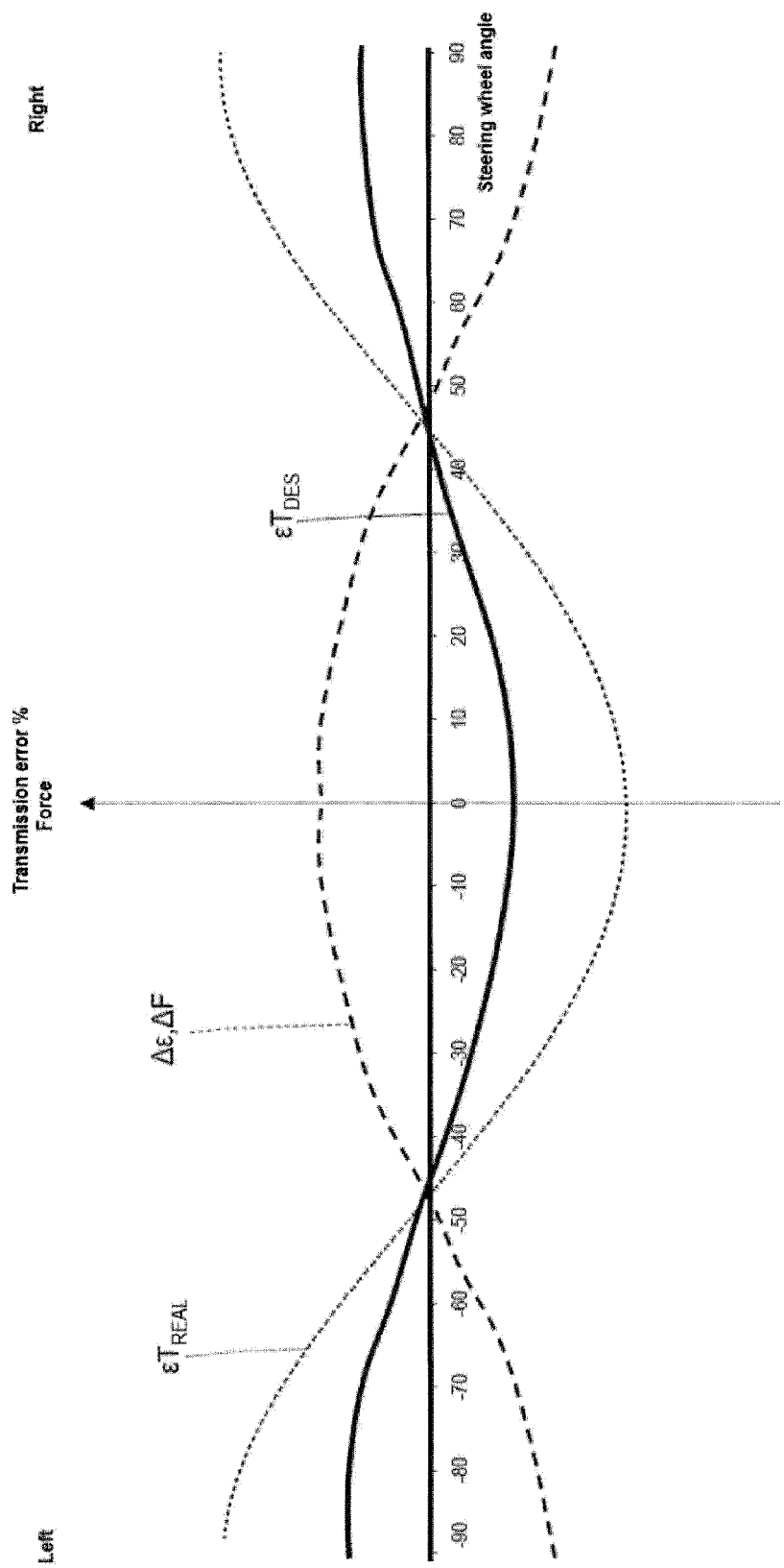
FIGS. 6 and 7 show two diagrams that illustrate the modes for reducing the transmission error determined by the structure of the transmission line in FIG. 2.
Figure 7:
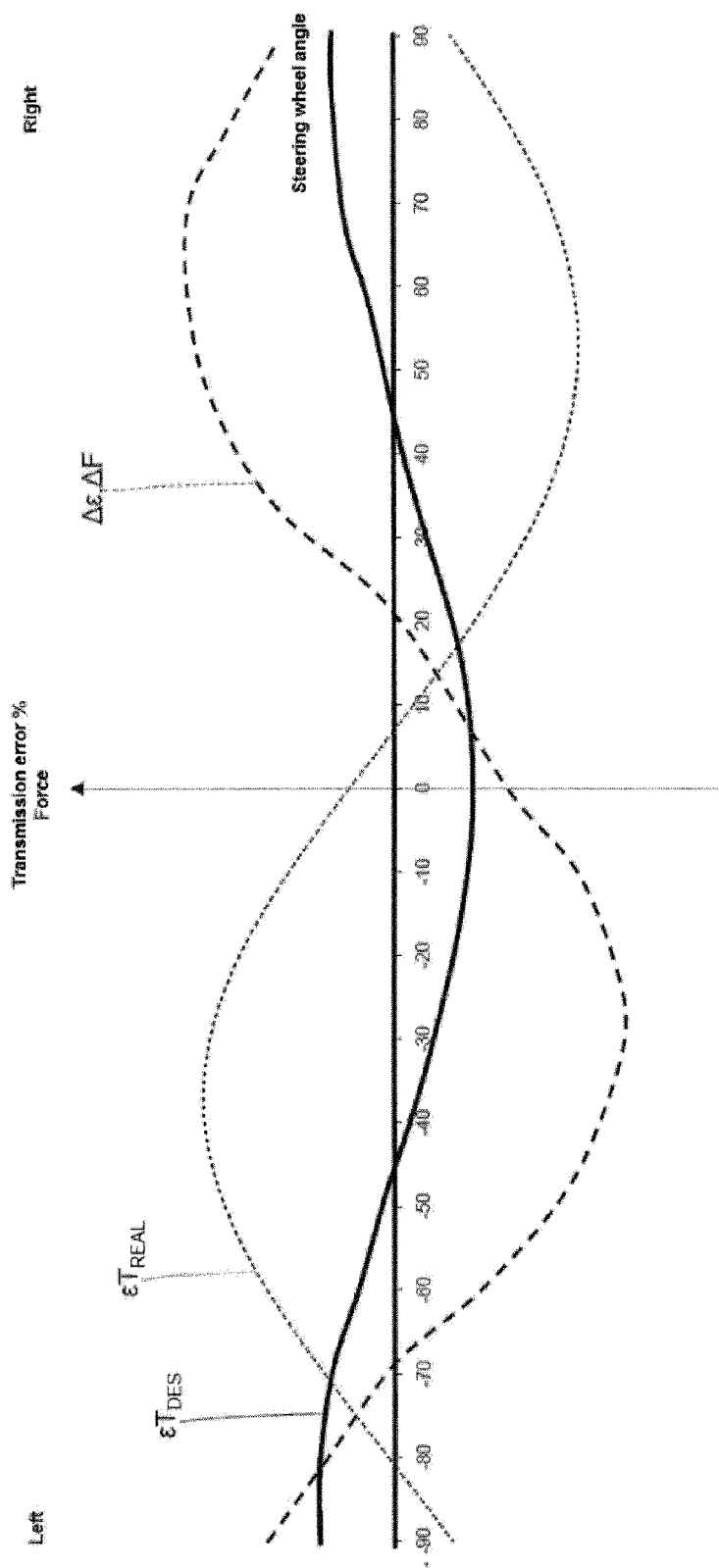

Moreover, in the preliminary step of designing and optimizing the steering system 4, a difference Δε between the target transmission error $\epsilon T_{DES}$ and the actual transmission error $\epsilon T_{REAL}$ is calculated (by means of a simple mathematical operation) for each angular position of the steering wheel 6; two examples of difference Δε are shown in FIGS. 6 and 7. Difference Δε between the target transmission error $\epsilon T_{DES}$ and the actual transmission error $\epsilon T_{REAL}$ is stored in a memory 20 of the control unit 18.

In the normal operation of the steering system 4, the control unit 18 measures the current angular position of the steering wheel 6 by means of sensor 19 and then changes the intensity of the servoassistance force applied by servomechanism 15 to the steering rod 5 as a function of the current angular position of the steering wheel 6 and as a function of difference Δε between the target transmission error $\epsilon T_{DES}$ and the actual transmission error $\epsilon T_{REAL}$ (i.e. as a function of the actual transmission error $\epsilon T_{REAL}$ and as a function of the target transmission error $\epsilon T_{DES}$).

Variation ΔF of the intensity of the servoassistance force is determined as a function of difference Δε between the target transmission error $\epsilon T_{DES}$ and the actual transmission error $\epsilon T_{REAL}$: variation ΔF of the intensity of the servoassistance force has the same sign as difference Δε between the target transmission error $\epsilon T_{DES}$ and the actual transmission error $\epsilon T_{REAL}$, and variation ΔF of the intensity of the servoassistance force has an absolute value directly proportional to the absolute value of difference $\Delta\epsilon$ between the target transmission error $\epsilon T_{DES}$ and the actual transmission error $\epsilon T_{REAL}$.

Thereby, on the effort at the steering wheel 6 (i.e. on the force that should be applied to the steering wheel 6 to turn the steering wheel 6 itself), the variation $\Delta F$ of the intensity of the servoassistance force determines a variation equal and opposite to the variation determined by difference $\Delta\epsilon$ between the target transmission error $\epsilon T_{DES}$ and the actual transmission error $\epsilon T_{REAL}$; therefore, due to the variation $\Delta F$ of the intensity of the servoassistance force, the driver "perceives" the same effort at the steering wheel 6 which would occur if the actual transmission error $\epsilon T_{REAL}$ determined by the mechanical structure of the transmission device 7 (and in particular of the transmission line 9 of the transmission device 7) were identical to the target transmission error $\epsilon T_{DES}$.

FIGS. 6 and 7 show two different examples in which the target transmission error $\epsilon T_{DES}$ is always the same, while the actual transmission error $\epsilon T_{REAL}$ is different, and thereby the difference $\Delta\epsilon$ and the corresponding variation $\Delta F$ of the intensity of the servoassistance force are different.

The above-described control method of the steering system 4 has several advantages.

First, the above-described control method of the steering system 4 allows a "post-compensation" to be carried out on the actual transmission error $\epsilon T_{REAL}$ determined by the mechanical structure of the transmission device 7 (and in particular of the transmission line 9 of the transmission device 7); thus, the design of the transmission device 7 (and in particular of the transmission line 9 of the transmission device 7) is free from strict mechanical constraints since the effect of a particularly high actual transmission error $\epsilon T_{REAL}$ (i.e. relatively very distant from the target transmission error $\epsilon T_{DES}$) is "compensated" by variation $\Delta F$ of the intensity of the servoassistance force applied by servomechanism 15 to the steering rod 5. In other words, the target transmission error $\epsilon T_{DES}$ is not achieved through the mechanical design of the transmission device 7 (and in particular of the transmission line 9 of the transmission device 7) which implies penalizing constraints, but it takes place later, through a "compensation" of the actual transmission error $\epsilon T_{REAL}$ by the variation $\Delta F$ of the intensity of the servoassistance force.

Moreover, the above-described control method is very simple and inexpensive to be implemented as it uses physical components that are already provided in the steering system 4, thus with no increase in the cost from the "hardware" point of view. Also from a "software" point of view, the above-described control method requires neither a large calculation power nor a large use of memory.

The invention claimed is:

1. A method to control a steering system (4) for a road vehicle (1), which steering system (4) adjusts the steering angle of the front wheels (2) of the road vehicle (1) by means of a steering wheel (6); the steering system (4) comprises:
   the steering wheel (6);
   a steering rod (5) that is mechanically connected to the hubs of the front wheels (2), and is axially slidingly mounted to change the steering angle;
   a transmission device (7) that transfers the rotational movement of the steering wheel (6) to the steering rod (5); and
   a servomechanism (15) that applies to the steering system (4) a variable servoassistance force;
   the control method comprises the following steps:
   determining, in a preliminary step of design and optimization, an actual transmission error ($\epsilon T_{REAL}$) caused by the mechanical structure of the transmission device (7) for each angular position of the steering wheel (6);
   choosing, in the preliminary step of design and optimization, a target transmission error ($\epsilon T_{DES}$) for each angular position of the steering wheel (6);
   measuring the current angular position of the steering wheel (6);
   calculating, for each angular position of the steering wheel (6), a difference ($\Delta\epsilon$) between the target transmission error ($\epsilon T_{DES}$) and the actual transmission error ($\epsilon T_{REAL}$); and
   determining a variation ($\Delta F$) on the intensity of the servoassistance force applied by the servo mechanism (15) based on the difference ($\Delta\epsilon$) between the target transmission error ($\epsilon T_{DES}$) and the actual transmission error ($\epsilon T_{REAL}$), so that the variation ($\Delta F$) of the intensity of the servoassistance force has the same sign as the difference ($\Delta\epsilon$) between the target transmission error ($\epsilon T_{DES}$) and the actual transmission error ($\epsilon T_{REAL}$).

2. A control method as claimed in claim 1, wherein the variation ($\Delta F$) of the intensity of the servoassistance force has an absolute value that is directly proportional to the absolute value of the difference ($\Delta\epsilon$) between the target transmission error ($\epsilon T_{DES}$) and the actual transmission error ($\epsilon T_{REAL}$).

3. A control method as claimed in claim 1 and further comprising the step of storing, for each angular position of the steering wheel (6), the difference ($\Delta\epsilon$) between the target transmission error ($\epsilon T_{DES}$) and the actual transmission error ($\epsilon T_{REAL}$) in a memory (20) of a control unit (18) that controls the servomechanism (15).

4. A control unit (18) of a steering system (4) of a road vehicle (1), which system adjusts the steering angle of the front wheels (2) of the road vehicle (1) by means of a steering wheel (6); the steering system (4) comprises:
   the steering wheel (6);
   a steering rod (5) that is mechanically connected to the hubs of the front wheels (2), and is axially slidingly mounted to change the steering angle;
   a transmission device (7) that transfers the rotational movement of the steering wheel (6) to the steering rod (5); and
   a servomechanism (15) that applies to the steering system (4) a variable servoassistance force;
   the control unit (18) is characterized in that:
   it measures the current angular position of the steering wheel (6) through a sensor (19);
   it calculates, for the current angular position of the steering wheel (6), a difference ($\Delta\epsilon$) between a target transmission error ($\epsilon T_{DES}$) chosen in a preliminary step of design and optimization and an actual transmission error ($\epsilon T_{REAL}$) determined in the preliminary step of design and optimization;
   it determines a variation ($\Delta F$) on the intensity of the servoassistance force applied by the servo mechanism (15) based on the difference ($\Delta\epsilon$) between the target transmission error ($\epsilon T_{DES}$) and the actual transmission error ($\epsilon T_{REAL}$), so that the variation ($\Delta F$) of the intensity of the servoassistance force has the same sign as the difference ($\Delta\epsilon$) between the target transmission error ($\epsilon T_{DES}$) and the actual transmission error ($\epsilon T_{REAL}$).

5. A control unit (18) as claimed in claim 4, wherein the variation ($\Delta F$) of the intensity of the servoassistance force has an absolute value that is directly proportional to the absolute value of the difference ($\Delta\epsilon$) between the target transmission error ($\epsilon T_{DES}$) and the actual transmission error ($\epsilon T_{REAL}$).

6. A control unit (18) as claimed in claim 4 and comprising a memory (20) in which, for each angular position of the steering wheel (6), the difference ($\Delta\epsilon$) between the target transmission error ($\epsilon T_{DES}$) and the actual transmission error ($\epsilon T_{REAL}$) is stored.

\* \* \* \* \*